Sept. 15, 1964 G. E. LARSSON 3,148,757

AUTOMATIC COIN-CONTROLLED RECORDING APPARATUS

Filed June 20, 1960 10 Sheets-Sheet 1

INVENTOR.
GEORGE E. LARSSON
BY
ATTORNEY

AUTOMATIC COIN-CONTROLLED RECORDING APPARATUS

Filed June 20, 1960

10 Sheets-Sheet 2

INVENTOR.
GEORGE E. LARSSON

BY

ATTORNEY

Sept. 15, 1964 G. E. LARSSON 3,148,757

AUTOMATIC COIN-CONTROLLED RECORDING APPARATUS

Filed June 20, 1960 10 Sheets-Sheet 3

INVENTOR.
GEORGE E. LARSSON
BY [signature]
ATTORNEY

INVENTOR.
GEORGE E. LARSSON
BY
ATTORNEY

Sept. 15, 1964 G. E. LARSSON 3,148,757

AUTOMATIC COIN-CONTROLLED RECORDING APPARATUS

Filed June 20, 1960 10 Sheets-Sheet 5

INVENTOR.
GEORGE E. LARSSON

BY [signature]

ATTORNEY

INVENTOR.
GEORGE E. LARSSON
BY
ATTORNEY

Sept. 15, 1964 G. E. LARSSON 3,148,757

AUTOMATIC COIN-CONTROLLED RECORDING APPARATUS

Filed June 20, 1960 10 Sheets-Sheet 7

INVENTOR.
GEORGE E. LARSSON
BY [signature]
ATTORNEY

INVENTOR.
GEORGE E. LARSSON
BY
ATTORNEY

Sept. 15, 1964 G. E. LARSSON 3,148,757

AUTOMATIC COIN-CONTROLLED RECORDING APPARATUS

Filed June 20, 1960 10 Sheets-Sheet 9

INVENTOR.
GEORGE E. LARSSON

BY W. T. [signature]

ATTORNEY

Sept. 15, 1964 G. E. LARSSON 3,148,757

AUTOMATIC COIN-CONTROLLED RECORDING APPARATUS

Filed June 20, 1960 10 Sheets-Sheet 10

INVENTOR.
GEORGE E. LARSSON
BY [signature]
ATTORNEY

United States Patent Office 3,148,757

Patented Sept. 15, 1964

3,148,757
AUTOMATIC COIN-CONTROLLED RECORDING APPARATUS

George E. Larsson, La Mirada, Calif., assignor to Auto-Photo Company, Los Angeles, Calif., a corporation of California Filed June 20, 1960, Ser. No. 37,131
20 Claims. (Cl. 194—2)

This invention relates to sound recording apparatus and more particularly to an improved coin controlled apparatus of the type particularly suitable but not limited to use in amusement and recreational areas, the apparatus being operable to make a permanent recording on a blank disc record and to dispense the finished recording to the purchaser at the conclusion of the recording operation.

More particularly, the present invention represents important refinements and improvements in coin controlled recording apparatus disclosed in an application for United States Letters Patent Serial No. 37,130, being filed concurrently herewith by John A. Baker, Lester A. Olson and Conrad M. Fritz entitled Automatic Coin-Controlled Sound Recording Apparatus. Not only are various components and sub-assemblies of this invention much simpler functionally and structurally but they are far more accessible for servicing and maintenance. Certain of the mechanical components of the earlier apparatus have been replaced in the present invention with electrical devices. Other important changes have also been made in both the temporary and in the second recorder. Preferably the temporary recorder employed in the present equipment employs a transistorized circuit requiring no warm-up period thereby making it feasible to deactivate the entire apparatus between periods of use.

Among the features of the present invention is its adaptability for control by separate coin switches for each recorder as well as by a single coin switch operable to initiate operation of both recorders. If separate coin switches are employed for each recorder, insertion of a coin in the first recorder initiates a dual cycle of the first recorder during the first cycle of which a message is recorded on the tape and during the second cycle of which the recorded message is played to the patron. Thereafter insertion of a coin in the second coin switch activates the second recorder to transfer the recorded sound track from the first recorder to a disc record clamped to the second recorder. Featured in this circuit is a coin reject accessory associated with the second switch as well as a pressure-operated switch under the floor pad on which the patron must stand while operating the equipment. These accessories cooperate in safeguarding against a second patron entering the recording apparatus booth and obtaining a record of the soundtrack made by the preceding patron thereby assuring all patrons against appropriation of a recorded soundtrack even though the apparatus is operated in a public place without an attendant.

Aiding and assuring the high fidelity of the permanent recording are numerous improvements including the use of D.C. power in a local circuit of the tape recorder utilized to modify the recorder circuits between recording and playback cycles. Likewise the possibility of unbalancing the first recorder circuits during different portions of the overall cycle of operation is avoided by maintaining the cutting head in circuit during both the initial playback cycle and the permanent record recording portion of the cycle.

Among the features of the present permanent recorder is the provision for isolating the turntable and recording head from vibrations and noises originating in the power and cam control sub-assembly. An incidental feature associated with the vibration dampening means is the fact that the turntable sub-assembly and its associated accessories are detachable as a unit from the power and cam control sub-assembly.

By virtue of an improved record delivery unit, blank records delivered from either side of the record magazine are routed into a common delivery chute discharging a record to the turntable along the same final path of approach to the turntable irrespective of the point of origin as respects the magazine. The significance of this improvement resides in the fact the cutting head and the suction air duct for carrying away the cuttings may then be on the diametrically opposite side of the record clamping device without in anywise interfering with the delivery of the blank records to the turntable.

Another improvement of importance is the mounting of the record receiving cradle serving to align the blank record with the turntable directly on the support for the record clamping pad. This arrangement, together with simplified actuating cam means for the clamping pad, function in concert with fixed stops to eject the completed record from the turntable into the delivery chute.

Accordingly, it is a primary object of the present invention to provide improved, simplified, highly reliable automatic recording apparatus designed to be operated by the novice without previous instruction or experience and capable of making a permanent record of a soundtrack desired by the patron automatically following deposit of appropriate coins within depository means provided therefor.

Another object of the invention is the provision of fully automatic sound recording apparatus normally deactivated and disconnected from an electrical power supply and instantly ready to make a recording of a soundtrack following deposit of a coin in a coin-operated switch effective to initiate the automatic cycling of the apparatus.

Another object of the invention is the provision of automatic sound recording apparatus arranged to be conditioned and its operating cycle initiated when the patron wishing to use the apparatus places his weight on a floor pad and a coin in a coin responsive switching device.

Another object of the invention is the provision of an automatic sound recording apparatus making use of a first recorder utilizing transistorized circuits to record a soundtrack temporarily on magnetic tape and a second or permanent record making recorder operatively associated with the first recorder and effective to transfer the temporary soundtrack from the tape thereof to a record mounted on the permanent recorder turntable.

Another object of the invention is the provision of a coin-operated sound recording apparatus utilizing a first and a second recorder arranged to be operated in sequence by the deposit of coins at predetermined spaced intervals in separate coin-operated switches controlling operation of the apparatus and embodying automatic means for ejecting coins of a second patron who seeks to make a copy of the temporary recording made by a preceding patron, whereby each patron is required to make his own temporary recording before it is possible to obtain a permanent recording from the apparatus.

Another object of the invention is the provision of a permanent recording recorder and including as principal sub-assemblies a power and control unit and a turntable unit readily detachably connected to the first unit through resilient vibration isolating members.

Another object of the invention is the provision of an automatic recorder utilizing a blank record magazine arranged to dispense records alternately from the opposite sides thereof together with means for channeling records dispensed from either side of the magazine into a common delivery chute operable to deliver the record to the recorder turntable thereby permitting the soundtrack cutting head and the chip removal facilities to be supported advantageously and without interfering with the delivery of records to the turntable or the discharge of the same at completion of recording.

Another object of the invention is the provision of automatic recording equipment utilizing simplified cam mechanism operating in timed sequence with the recording operation to initiate and terminate the recording operation in predetermined timed relation with the clamping of a record disc to the turntable and the discharge of the completed record therefrom.

These and other more specific objects will appear upon reading the following specification and claims and upon considering in connection therewith the attached drawings to which they relate.

Referring now to the drawings in which preferred embodiments of the invention are illustrated.

FIGURE 7 is a longitudinal vertical sectional view on an enlarged scale through the permanent record recorder taken along line 8—8 on FIGURE 1;

Figure 15A:
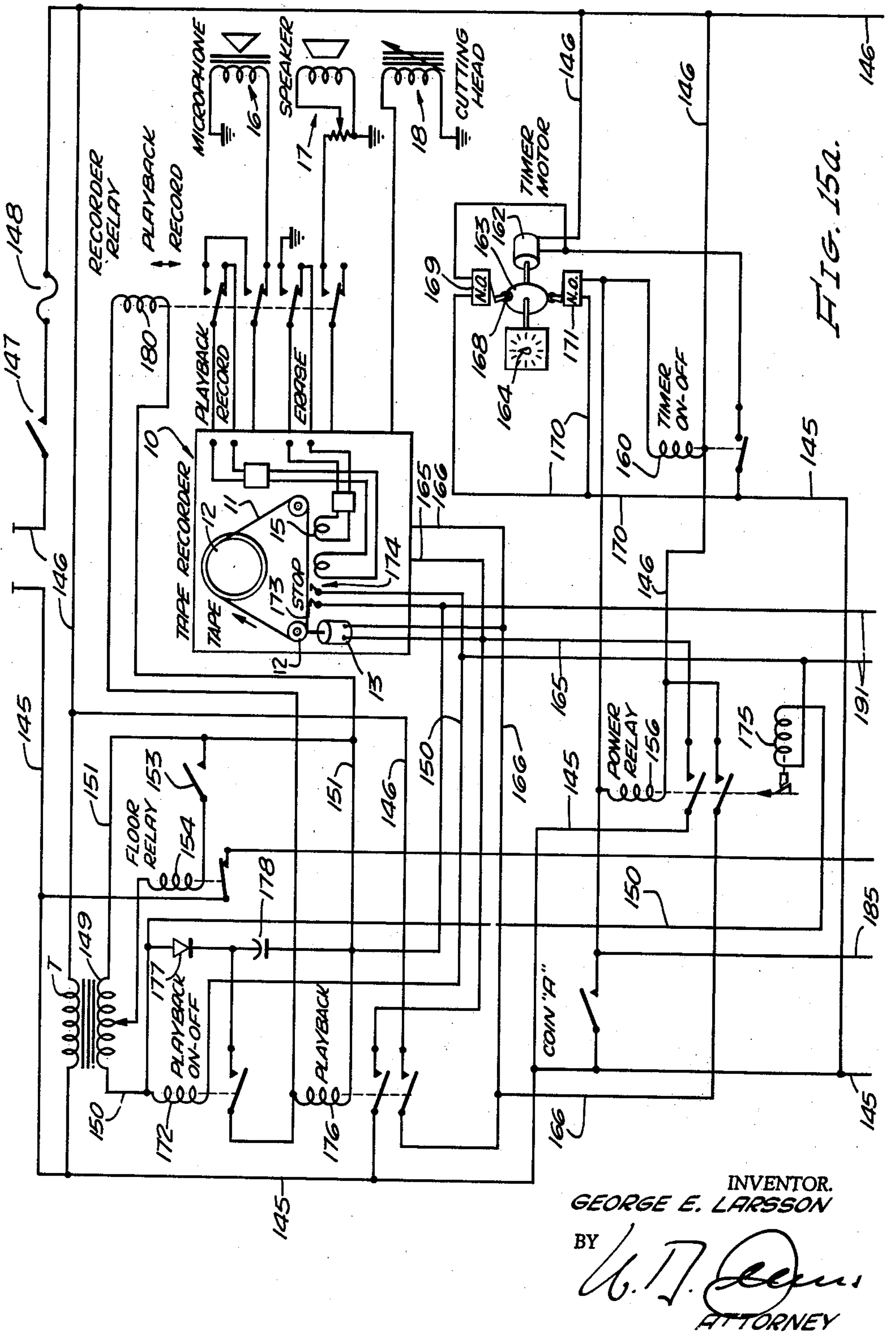
Figure 15B:
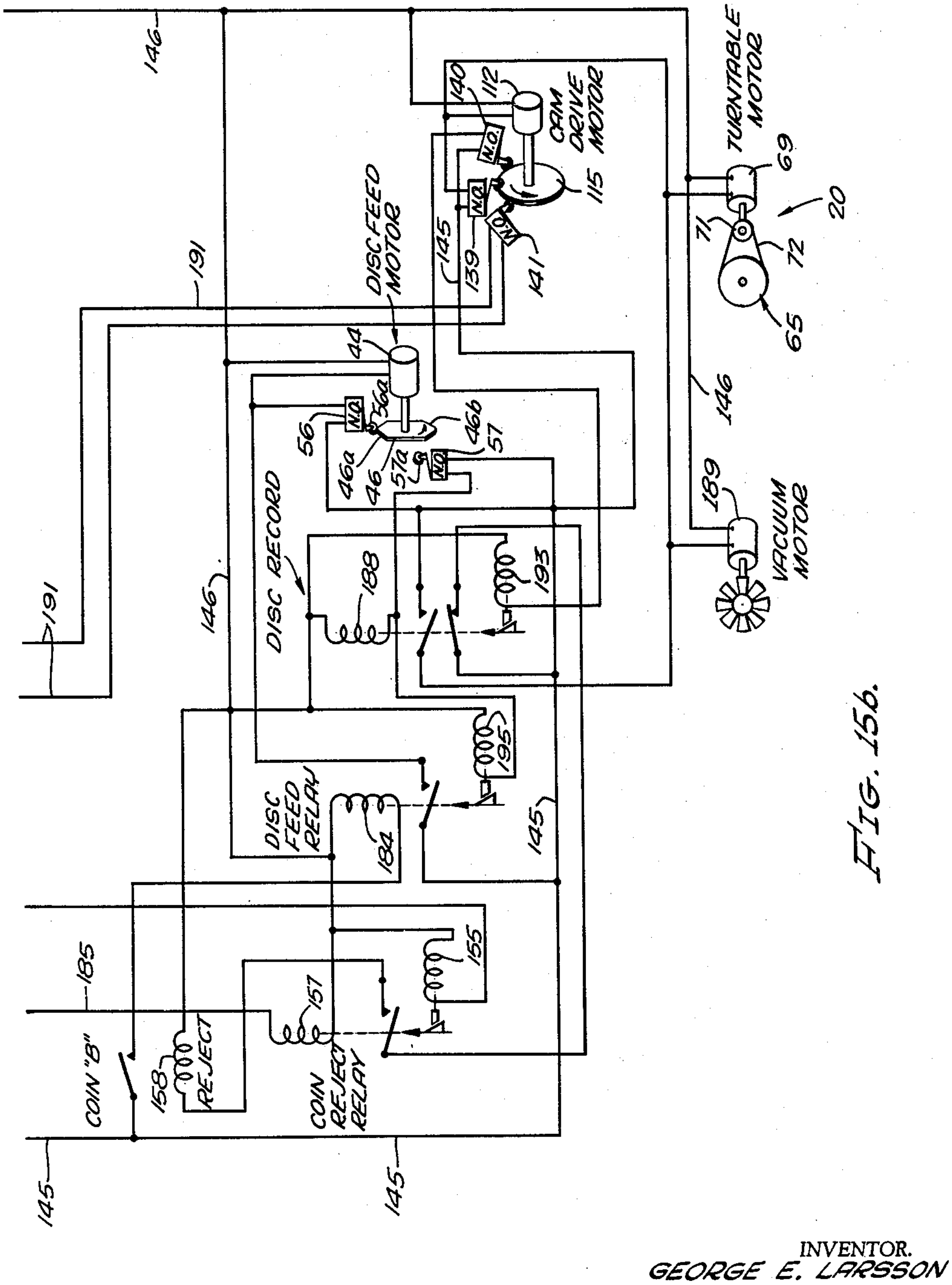
Figure 16:
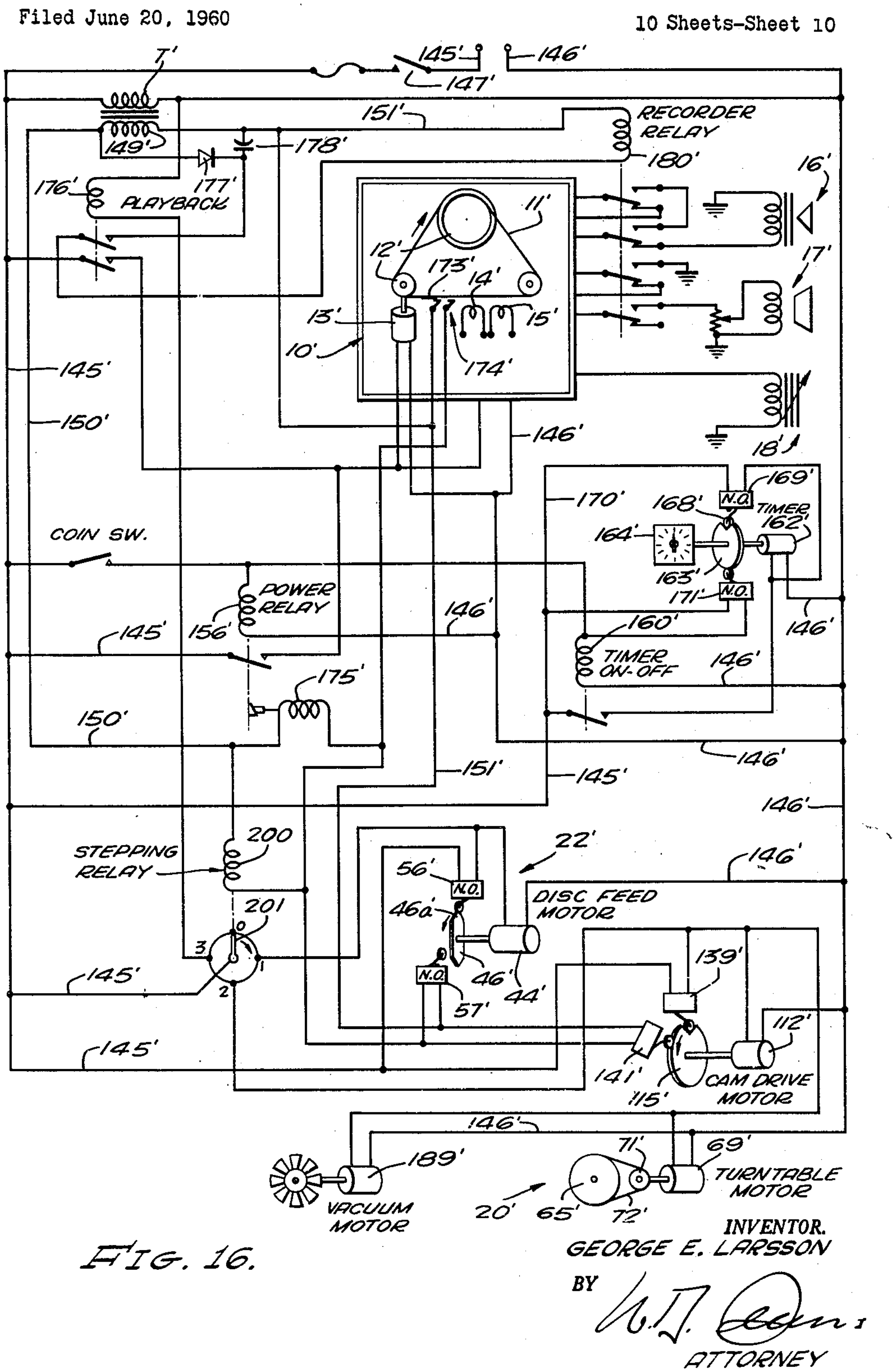

FIGURES 15*a* and 15*b* taken together, show diagrammatically and schematically the control circuits for the complete automatic sound recording apparatus according to one preferred embodiment thereof; and FIGURE 16 is schematic representation of a simplified embodiment of the invention.

Referring now more particularly to FIGURES 15*a* and 15*b*, it is pointed out that the first or preliminary recorder and its accessories are shown largely in FIGURE 15*a*, whereas the premanent recorder and it accessories are shown largely in the FIGURE 15*b* portion of the schematic. The temporary recorder proper preferably comprises a transistorized magnetic tape recorder of conventional commercial design here represented schematically and designated generally 10.

The recording medium proper for recorder 10 comprises a continuous loop of magnetic tape 11 supported in known manner on pulleys 12, one of which is arranged to be driven by the constant speed tape transport motor 13. Tape 11 is advanced past a combination recording and playback head 14 and an erasing head 15 in known manner each understood as functioning in accordance with principles well known in this art. A microphone 16 is coupled to the input of recorder 10, whereas loudspeaker 17 and cutting head 18 are connected to the output of the recorder amplifier. The cutting head will be understood as operatively associated with the permanent recorder and is preferably directly connected to the amplifier output at all times, whereas speaker 17 is activated only during playback operation. The reasons for driving the cutting head during playback as well as during actual recording will be described more fully presently.

Referring now to FIGURE 15*b*, it is pointed out that the permanent recorder is schematically represented at 20 although it will be appreciated that the several motors shown in FIGURE 15*b* also comprise important auxiliaries of this recorder. The remaining components of FIGURES 15*a*, 15*b* comprise the various control components, including the two coin-operated switches A and B for initiating operation of the first and second recorders, respectively. The manner in which these controls function will be described following a detailed description of the second recorder.

*Second Recorder in General*

Figures 1, 7:
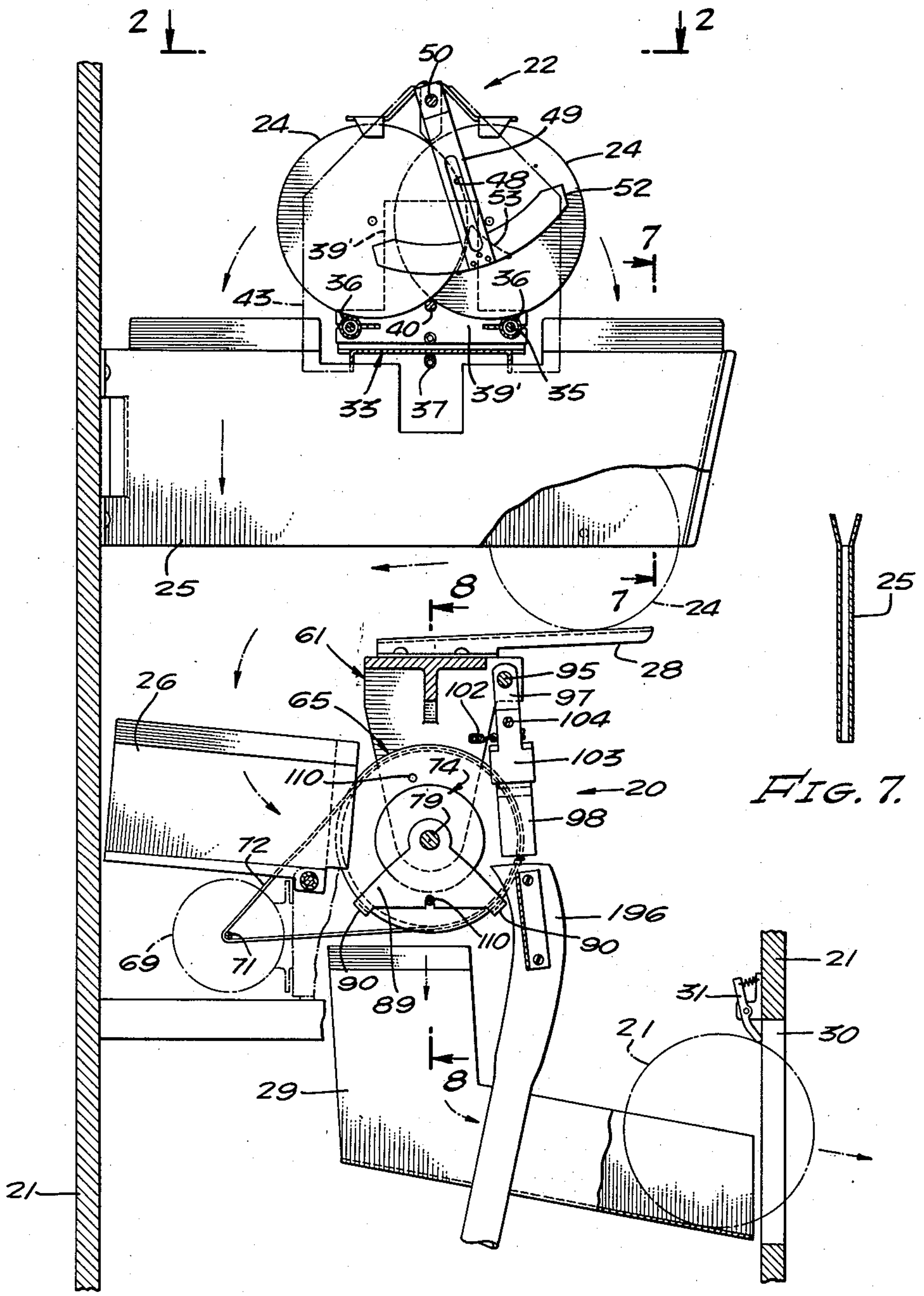
FIGURE 1 is a fragmentary vertical sectional view through one preferred embodiment of the record magazine and permanent recorder equipment employed in practicing this invention, this view being taken in part along line 1—1 on FIGURE 3 and in part along line 1—1 on FIGURE 8.
FIGURE 7 is a vertical sectional view taken along line 7—7 on FIGURE 1 showing details of the record guide chute.
Figures 2, 4:
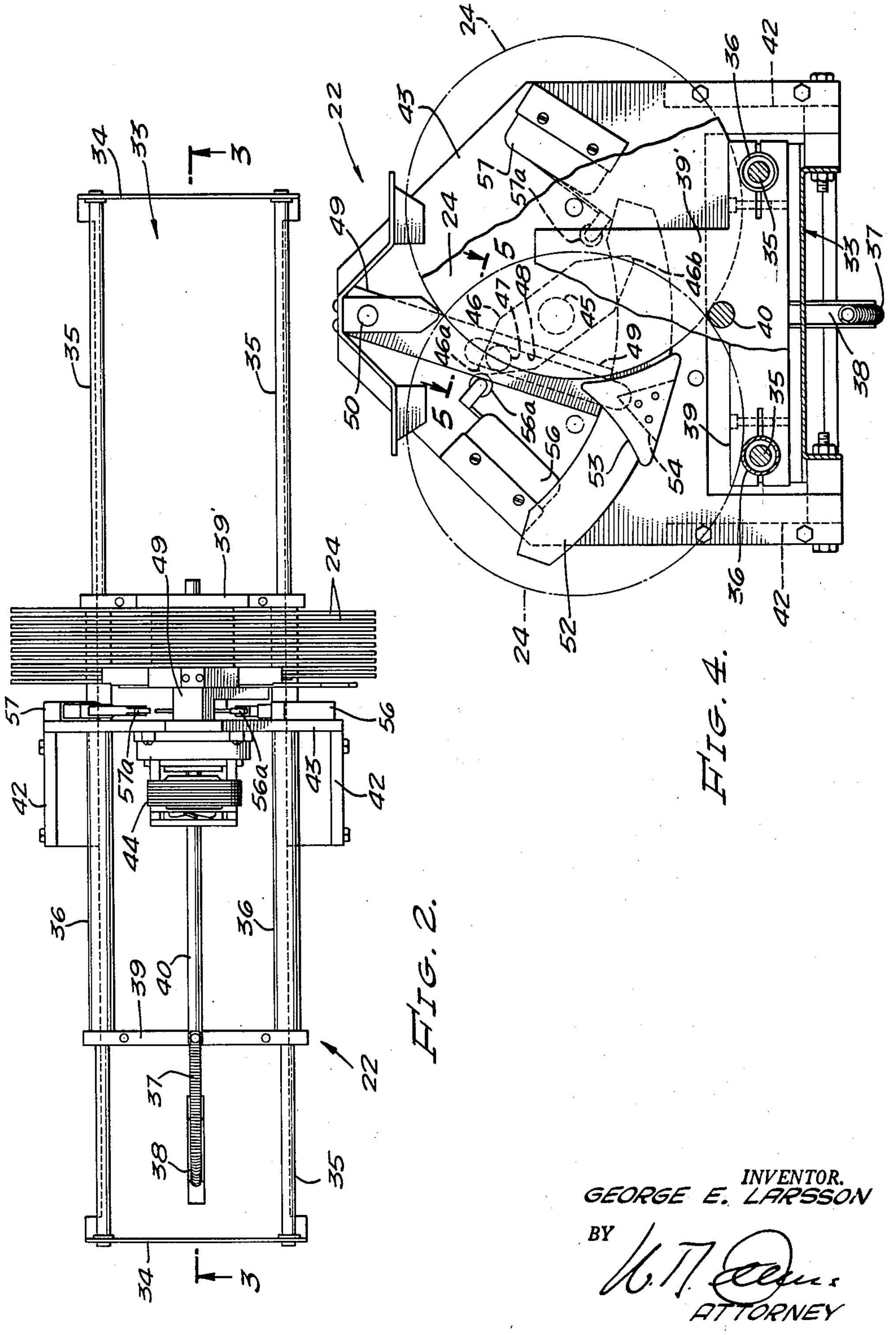
FIGURE 2 is a top plan view of principal components of the record magazine taken along line 2—2 on FIGURE 1.
FIGURE 4 is a cross-sectional view through the magazine taken along line 4—4 on FIGURE 3.

Referring now to FIGURES 1 to 7 and first, more particularly to FIGURE 1, it will be understood that the equipment of the complete automatic recorder is housed within a booth or other suitable enclosure 21 indicated only in part in the drawing and understood as including suitable maintenance access doors normally locked closed. Rigidly supported in an upper portion of housing 21 is a blank record magazine designated generally 22 having the same general construction described in detail in the above identified application for patent. Magazine assembly 22 extends generally parallel to and above the permanent sound recorder proper 20 in order that a blank record discharged from the magazine may travel by gravity into clamping position opposite the recorder turntable 65. A disc record 24 dispensed from the left hand side of magazine 22 falls vertically through guide chute 25 into the mouth of lower guide chute 26 and rolls into an aligning cradle 89 adjacent the face of turntable 65. The next record 24 is dispensed from the opposite or right hand side of magazine 22 as viewed in FIGURE 1 and falls into the right hand half of chute 25 and onto the underlying downwardly inclined trackway 28. This latter record rolls along trackway 28 and into lower guide chute 26 for delivery to cradle 89 in exactly the same manner as just described with respect to a record dispensed from the left hand side of the magazine. After a soundtrack has been recorded on a disc, the completed record is discharged from the turntable 65 and falls downwardly into the inlet end of an L-shaped delivery chute 29, the lower end of which opens into vertical slot 30 in the side wall of booth 21 and is lightly detained in partially exposed position by a suitable spring pressed detent 31 until forcibly pulled from slot 30 by the patron.

*Record Magazine Construction*

Structural details of magazine 22 are best shown in FIGURES 1 to 5. The main frame of the magazine comprises an elongated channel-shaped member 33 having upturned ends 34 rigidly supporting a pair of parallel guide rails 35 slidably supporting therealong the record carriage 36. This carriage is urged toward the left along guide rails 35, as viewed in FIGURE 3, by means of a coil spring 37 having one end connected to the rear end of the carriage, its intermediate portion trained over a grooved roller 38 and its opposite end connected to the rear end of main frame 33. The opposite ends of carriage tubes 36 are interconnected by cross-strips 39, 39', the latter being at the rear end and relatively high compared to front end cross-piece 39. Supported by these cross-pieces midway between tubes 36, 36 and at a slightly higher elevation is a rod 40. Carriage tubes 36 and intermediate rod 40 are so disposed as to support two rows of interleaved blank records 24, 24 in the manner made clear by FIGURES 1 and 4.

Thus it is pointed out that the adjacent rim edges of the two rows of records overlap and interleave alternately with one another to facilitate separation of the records in case they tend to stick together after prolonged storage under adverse conditions. Since the axis of the center of gravity of each row is located slightly inwardly of the adjacent carriage tube 36, it will be recognized that each row is largely supported by carriage tube 36 and only slightly by rod 40. Accordingly, only slight lateral movement away from rod 40 is required to dispense a record from the magazine.

Rigidly supported, as by brackets 42, midway of the length of rails 35 is an upright panel 43 supporting thereon a record dispensing mechanism operable to dispense a single record only each time the mechanism is energized. Motor 44 operates to drive a shaft 45 through suitable speed reduction gearing. Secured to shaft 45 is an elongated cam strip 46 having diametrically opposed pointed ends 46*a*, 46*b*. Secured to and projecting axially from the rear face of cam strip 46 near one end thereof is a pin supported roller 47 operating in a slot 48 formed lengthwise of a record dispensing arm 49, the latter being pivotally supported on a shaft 50 fixed to the upper end of upright panel 43.

Firmly secured crosswise to the lower end of dispensing arm 49 is an arcuate guard member 52 (FIGURES 1 and 4) which together with arm 49, oscillates back and forth across the forward end of the two rows of records 24 as crank pin 47 rotates and moves along slot 48 of dispensing arm 49. Accordingly, it will be appreciated that guard 52 provides a forward end stop for the records in the magazine and cooperates in maintaining the records in an upright position.

Secured centrally to the rear face of guard arm 52 is a triangularly shaped record pusher 54 and a similarly shaped larger area record separting blade 53. The sharp lateral edges of blade 53 are disposed to enter between the contacting surfaces of the two foremost records in the interleaving area to separate them and to guide the outer of the two records into engagement with pusher 54 during a dispensing swing of arm 49.

The thickness of pusher 54 is sufficiently greater than the thickness of the individual records as to engage the edge of a record and push it from the magazine thereby safeguarding against the opposite faces of the record being gripped between arm 49 and blade 53. From the foregoing it will be clear that only a single record can be dispensed during any given single swing of dispensing arm 49 accomplished by a 180 degree rotation of motor shaft 45.

Rigidly secured to panel 43, as along its opposite lateral areas, are a pair of micro-switches 56, 57 (FIGURE 4), switch 56 being a stop switch for record dispensing motor 44 and switch 57 being effective to reset one of the circuit control relays as will be explained more fully presently. It is important to note at this time that the cam follower actuating roller 56*a* for switch 56 is positioned to ride along the edge of cam strip 46 and to actuate stop switch 56 to stop motor 44 as dispenser arm 49 reaches the left hand extremity of its swing as viewed in FIGURE 4. When cam 46 rotates through the next 180 degrees, its opposite pointed end 46*b* will then underide cam roller 56*a* and will be effective to stop motor 44 while dispensing arm 49 is close to the right hand extremity of its swing with knife blade 53 and pusher 54 disposed beyond the edge of the next record to be dispensed.

It is likewise pointed out that the cam follower roller 57*a* controlling the operation of switch 57 is disposed less than 180 degrees from cam roller 56*a* with the result that switch 57 is actuated by one of the pointed ends of cam 46 while motor 44 is still operating and before switch 56 is operated to deactivate the driving motor 44. The purposes of this arrangement of the switches will be explained below.

Figures 3, 6:
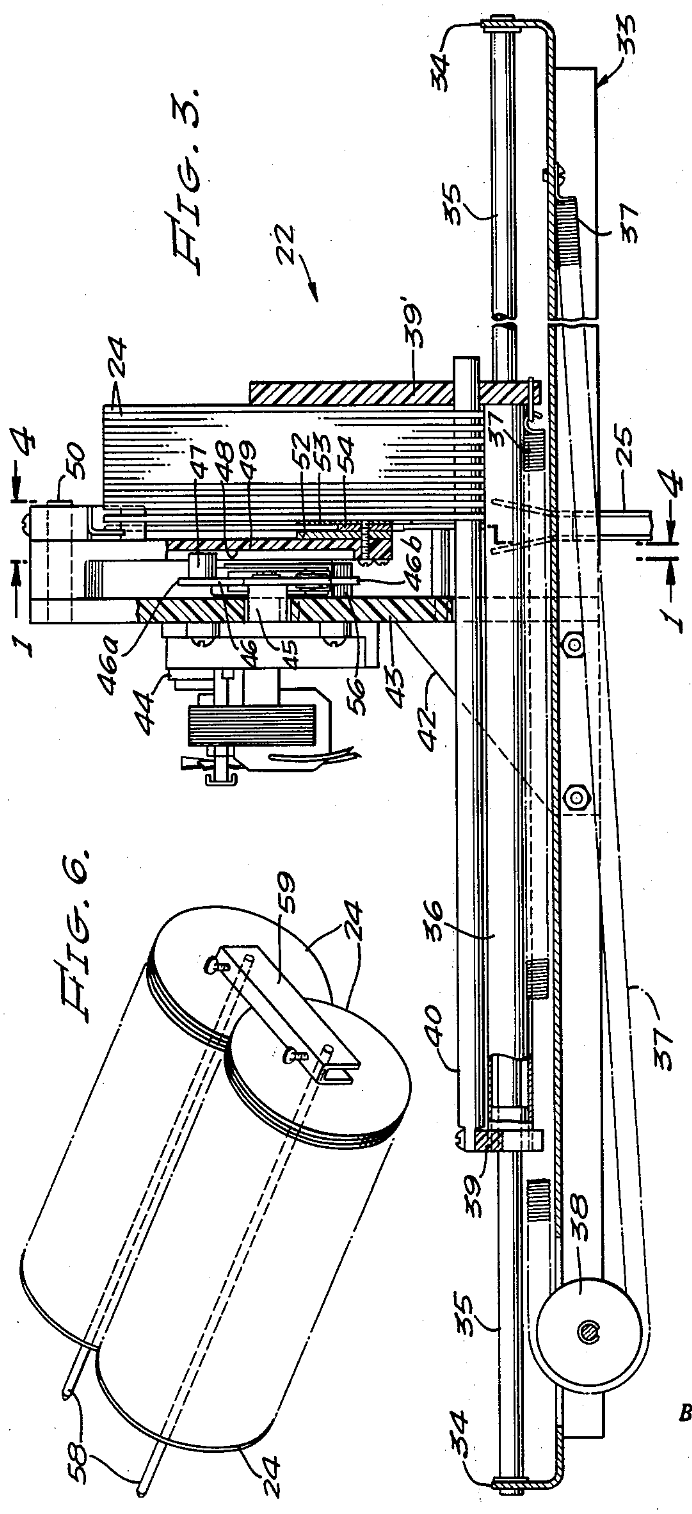
FIGURE 3 is a longitudinal sectional view on an enlarged scale of the record magazine taken along line 3—3 on FIGURE 2.
FIGURE 6 is a small scale perspective view of the accessory employed in stacking blank records preliminary to the loading of the same on the supporting bars of the record magazine.
Figure 5:
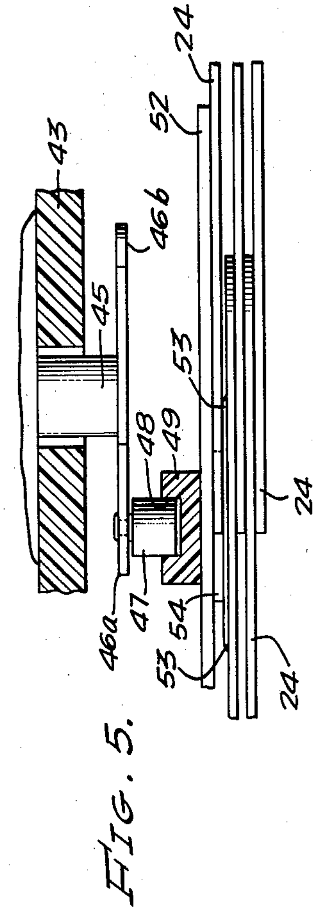
FIGURE 5 is a fragmentary section view on an enlarged scale taken along line 5—5 on FIGURE 4 showing details of the record dispensing mechanism.

Before completing discussion of the record magazine it is pointed out that FIGURE 6 shows an accessory useful in preparing the blank records 24 for loading into the magazine. This fixture comprises a pair of rods 58 sized to fed freely through the center hole of the record discs. These rods are rigidly interconnected at one end by a cross strip 59 provided with thumb screws or the like for holding rods 58 in place. The loading accessory is normally supported in an upright position as blank records are threaded over the upper ends of first one and then the other of rods 58. Transfer of the records onto the magazine carriage while so pre-arranged on the loading accessory is accomplished by pulling the carriage 36 rearwardly along guide rails 35 to its rearmost position whereupon the loading accessory with its charge of records is laid upon carriage 36. The loading accessory is wtihdrawn and spring 37 is allowed to pull the charged carriage forwardly along rails 35 until the foremost pair of records rest on arcuate guard 52 of the record dispensing mechanism.

*The Recorder Proper*

Figure 8:
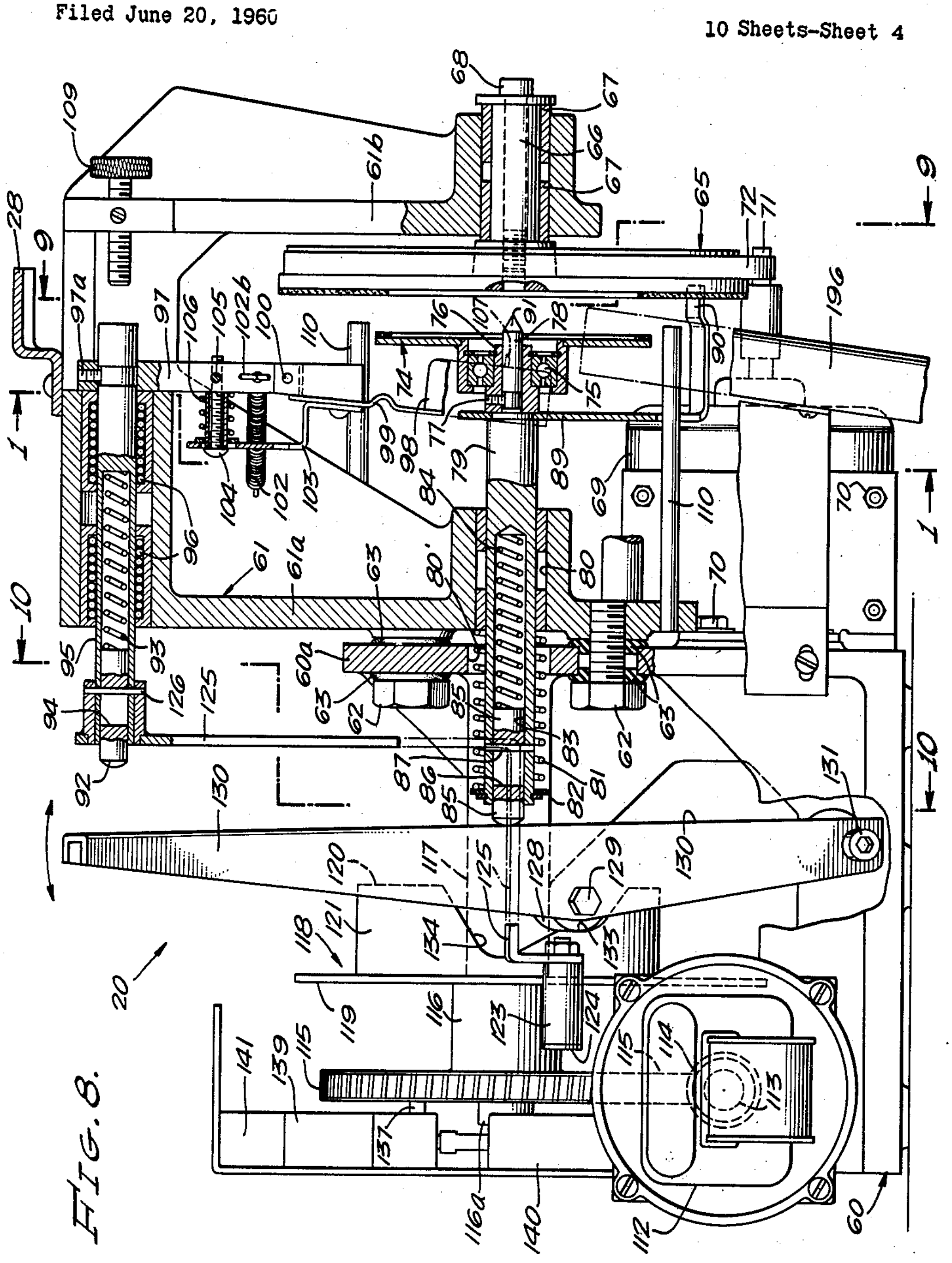

Referring now to FIGURES 8 to 13, and more particularly to FIGURE 8, the permanent recorder proper will be described. This assembly comprises two principal subassemblies including a power subassembly mounted on an upright U-shaped frame 60 and a turntable subassembly carried by an inverted U-shaped frame 61. Frames 60, 61 are located in side-by-side relation with their oppositely extending adjacent legs 60*a*, 61*a* (FIGURE 8) detachably secured together by cap screws 62, metal-to-metal contact between the legs being prevented by soft rubber grommets or the like 63 inserted about the cap screws and between the legs in the manner made clear by FIGURE 8. It will therefore be understood that main frame 61 for the turntable is resiliently supported from the power unit frame 60 to assure isolating the turntable and the components directly associated therewith from any vibration or the like emanating from the power subassembly.

The turntable proper 65 is held detachably clamped to the end of a shaft 66 and held assembly within bearings 67 by a flanged cap screw 68, the threaded end of screw 68 mating with the threaded central bore of the turntable. As is made clear by FIGURE 8, bearings 67 have a press fit within a transverse bore through leg 61*b* of the U-shaped frame 61. The turntable driving motor 69 is mounted on the power unit frame 60, as by cap screws 70, and pulley 71 on the motor shaft is disposed to one side of the reduced diameter rear of turntable 65 and drivingly connected thereto by a flexible belt 72.

The pressure pad assembly for clamping a record to turntable 65 comprises a clamping disc or pad 74 journaled on an anti-friction bearing 75 supported by a bushing 76 detachably clamped by a set screw 77 to the reduced diameter end 78 of a spindle 79. Spindle 79 is slidably and non-rotatably supported within suitable bearings mounted in a bore 80 aligned with the axis of turntable shaft 66. As is made clear by FIGURE 8, bore 80 extends through leg 61*a* of turntable frame 61 and its left-hand end has ample radial clearance with an opening 80' through leg 60*a* of power unit frame 60. Encircling the left-hand end of spindle 79 is a compression spring 81 one end of which bears against suitable stop means 82 at the outer end of the spindle in a manner urging the spindle and clamping pad 74 to the left away from the face of turntable 65. An axial well 83 formed in the outer end of spindle 79 seats a compression spring 84 bearing against a plunger 85 slidably supported at the inlet of well 83. Plunger 85 has an elongated transverse slot 86 for receiving a keeper pin 87 the ends of which have a press fit with a transverse bore through spindle 79. Spring 84 normally holds plunger 85 pressed against keeper pin 87 but permits the plunger to move inwardly along well 83 thereby to provide resilient lost motion between the plunger and spindle 79 for purposes to be explained presently.

A feature of spindle 79 and of clamping pad 74 resides in the provision of a record receiving cradle 89 suspended from the right hand end of spindle 79 as viewed in FIGURE 8, this cradle having fingers 90 lying parallel to the turntable shaft and with their free ends closely spaced beside the rim of turntable 65 in approximately the 4:30 and 7:30 o'clock positions of the turntable rim, as is best shown in FIGURE 1. Cradle 89 and fingers 90, being mounted on the nonrotating spindle 79, are shiftable crosswise of the turntable rim as the spindle is shifted axially and serve initially to receive a blank disc 24 from delivery chute 26 (FIGURE 1) and support the same with the center opening of the record in general registry but spaced slightly below the center opening in turntable 65. In consequence, movement of spindle 79 toward the turntable permits the pointed or pilot end 91 of spindle 79 to enter the record opening and lift the record off fingers 90 as the record is pressed against the resilient face of the turntable. Continued movement of spindle 79 to the right as viewed in FIGURE 8 brings clamping pad 74 against the record only after it has been accurately centered on the turntable and then clamps the record firmly in position. It will be apparent that clamping pad 74, the record and the turntable then rotate as a unit. During the described clamping operation, cradle 89 and fingers 90 move toward the turntable but remain out of contact with it.

The means for supporting the cutting head and for controlling its operating movements will now be described with the aid of FIGURES 1, 8 and 9. A supporting and manipulating shaft 95 for the head is rotatably and slidably supported within anti-friction bearings 96 mounted in a bore transversely of the bight portion of main bracket 61. The cutting head supporting arm 97 is fixedly secured by a set screw 97*a* to the right hand end of shaft 95 as viewed in FIGURE 8. The cutting head proper 98 is fixed to the lower end of a lightweight strip metal support 99 hingedly connected to the lower end of arm 97 by a hinge pin 100. Since the axis of hinge pin 100 lies parallel to the face of turntable 65, it will be clear that the cutting head 98 is restricted to pivoting toward and away from the turntable.

Figure 9:
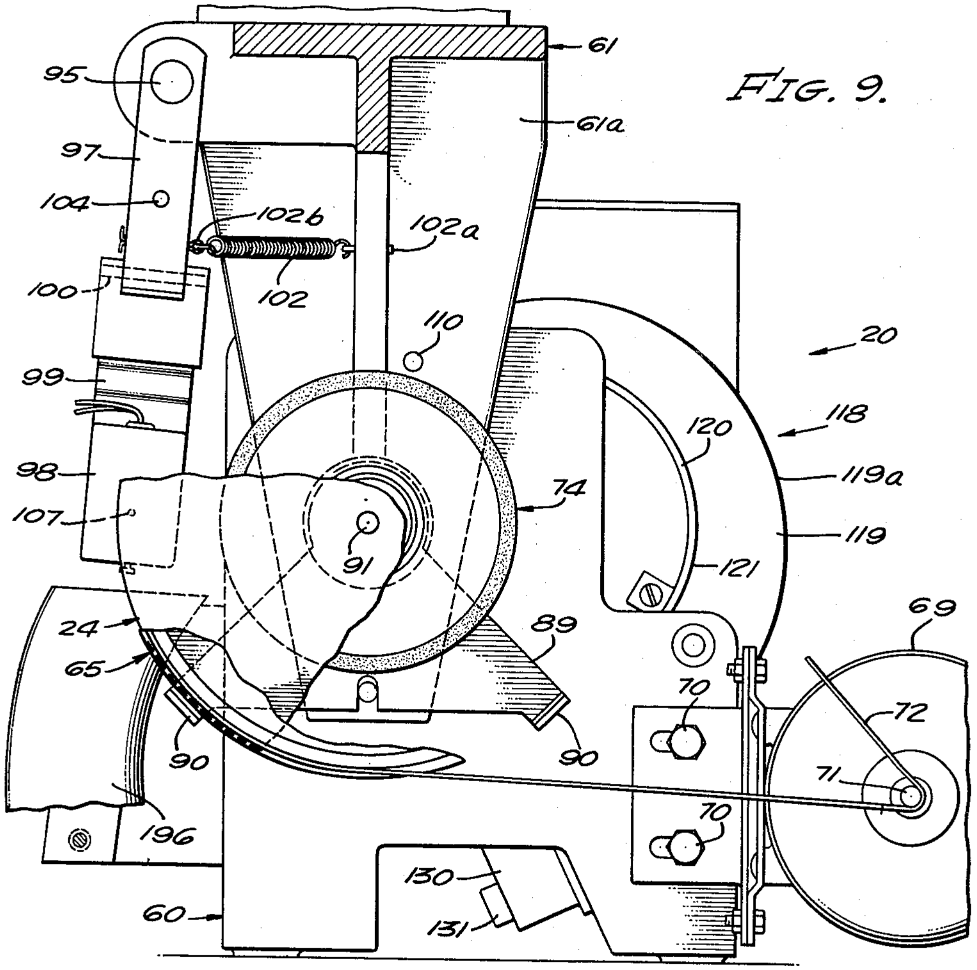
FIGURE 9 is a fragmentary vertical sectional view taken along broken line 9—9 on FIGURE 8.

Shaft 95 and supporting arm 97 for the cutting head are resiliently urged to the retracted position of the cutting head (FIGURE 8) by means of a long tension spring 102 having one end fixed to frame 61 as by a cotter pin 102*a* (FIGURE 9) and its other end secured to arm 97 as by a cotter pin 102*b* (FIGURE 9). Not only does spring 102 hold the cutting head retracted away from the turntable but it also functions to rotate supporting arm 97 and shaft 95 counterclockwise as viewed in FIGURE 9 to shift the cutting head proper inwardly toward the center of the turntable. The cam means resisting this counterclockwise movement is associated with the power unit subassembly mounted in frame 60 and will be described presently.

The cutting head is lightly and resiliently balanced in a normal neutral position about the axis of hinge pin 100 by adjustable spring means now to be described. This means includes a bracket 103 having its lower end secured to the suspension strip 99 for the cutting head. The free end of bracket 103 projects upwardly generally parallel to supporting arm 97 and has a large opening fitting loosely about a sleeve surrounding the shank of a stop screw 104 adjustably mounted in arm 97. Screw 104 can be clamped in any desired position by set screw 105. When the cutting head is out of contact with a record, the upper end of bracket 103 is held against the head of cap screw 104 by a light coil spring 106 interposed between arm 97 and the innerside of bracket 103 in the manner best shown in FIGURE 8. When the cutting head is moved inwardly against the record such contact will be effective to urge the cutting head to pivot clockwise (as viewed in FIGURE 8), and this movement will be resisted by light spring 106. Accordingly, it will be evident that the pressure applied to the cutting stylus 107 (FIGURES 8 and 13) is controlled largely by spring 106 and can be varied by the adjustment of cap screw 104 in arm 97 as well as by the axial shifting of arm 97 along supporting shaft 95 within the limits permitted by the groove in which set screw 97*a* operates.

Still a third adjustment provided for the cutting head comprises a stop screw 109 mounted in leg 61*b* of the main frame directly opposite the right hand end of cutting head shaft 95 (FIGURE 8). The threads of this cap screw have a tight frictional fit with the supporting bore and this fit may be supplemented by a set screw, if desired.

The remaining feature of the turntable subassembly concerns a pair of fixed stops 110 (FIGURES 8, 12) positioned above and below the rim of pressure pad 74 with their outer free ends closely spaced from the face of turntable 65. It is important that there be a sufficient gap between stops 110, 110 and the turntable for the unobstructed entry of a blank record from delivery chute 26 yet small enough for the stops to be effective in stripping the record from clamping pad 74 and end 78 of the spindle during retraction of the clamping pad. FIGURE 8 shows the relative positions of the parts at the beginning of an operating cycle, fingers 90 of record receiving cradle 89 then being positioned to receive and roughly register a record with the turntable as received from delivery chute 26. However, during extreme retraction movement of the pressure plate, the relative positions of the parts are that shown in FIGURE 13, it being apparent that, under these conditions, pressure pad 74 is retracted to the left considerably beyond the free end of stops 110 and that fingers 90 of cradle 89 are likewise withdrawn to the left sufficiently to permit the completed record 24 to drop vertically into the mouth of delivery chute 29.

*Recorder Power and Cam Control Subassembly*

The power and cam control subassembly mounted on U-shaped frame 60 is illustrated in FIGURES 8 to 13. In addition to the turntable driving motor 69, there is rigidly secured transversely of frame 60 a main cam drive motor coupled through suitable speed reduction means to a shaft 113 (FIGURE 10) extending crosswise of frame 60 and having its ends mounted in suitable bearings. A worm gear 114 secured to the midportion of shaft 113 meshes with a driven gear 115 secured to a spool 116 journaled about the shank of a shouldered cap screw 116*a* anchored in the end of a bracket 117 integral with frame 60 (FIGURES 10, 11), the axis of spool 116 being offset laterally but parallel to the axis of spindle 79 (FIGURE 10) and shaft 66 for turntable 65.

Figures 10, 11:
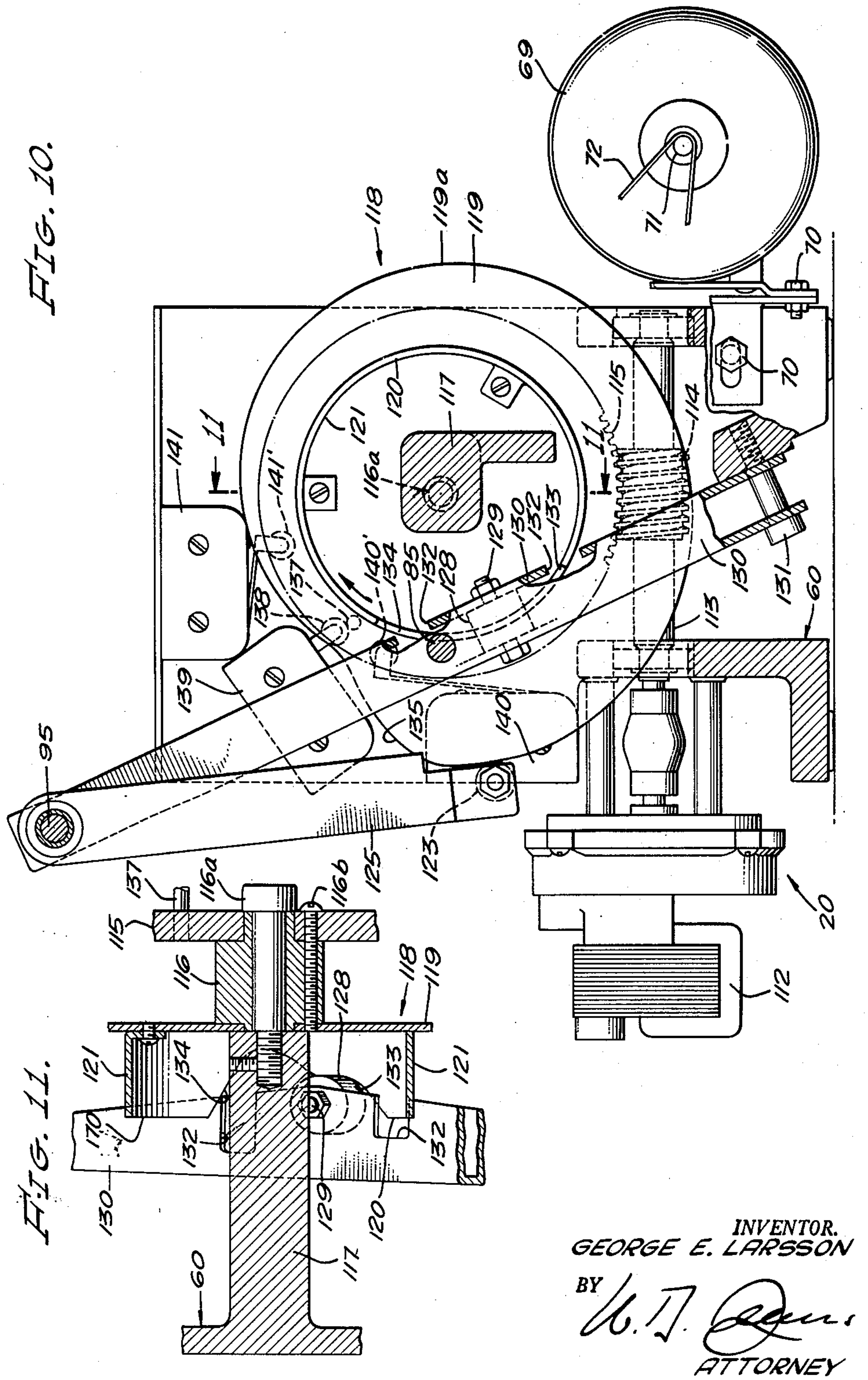
FIGURE 10 is a view similar to FIGURE 9 taken along broken line 10—10 on FIGURE 8.
FIGURE 11 is a fragmentary cross-sectional view throughout the cam disc and the cam follower lever taken along line 11—11 on FIGURE 10.
Figures 12, 13:
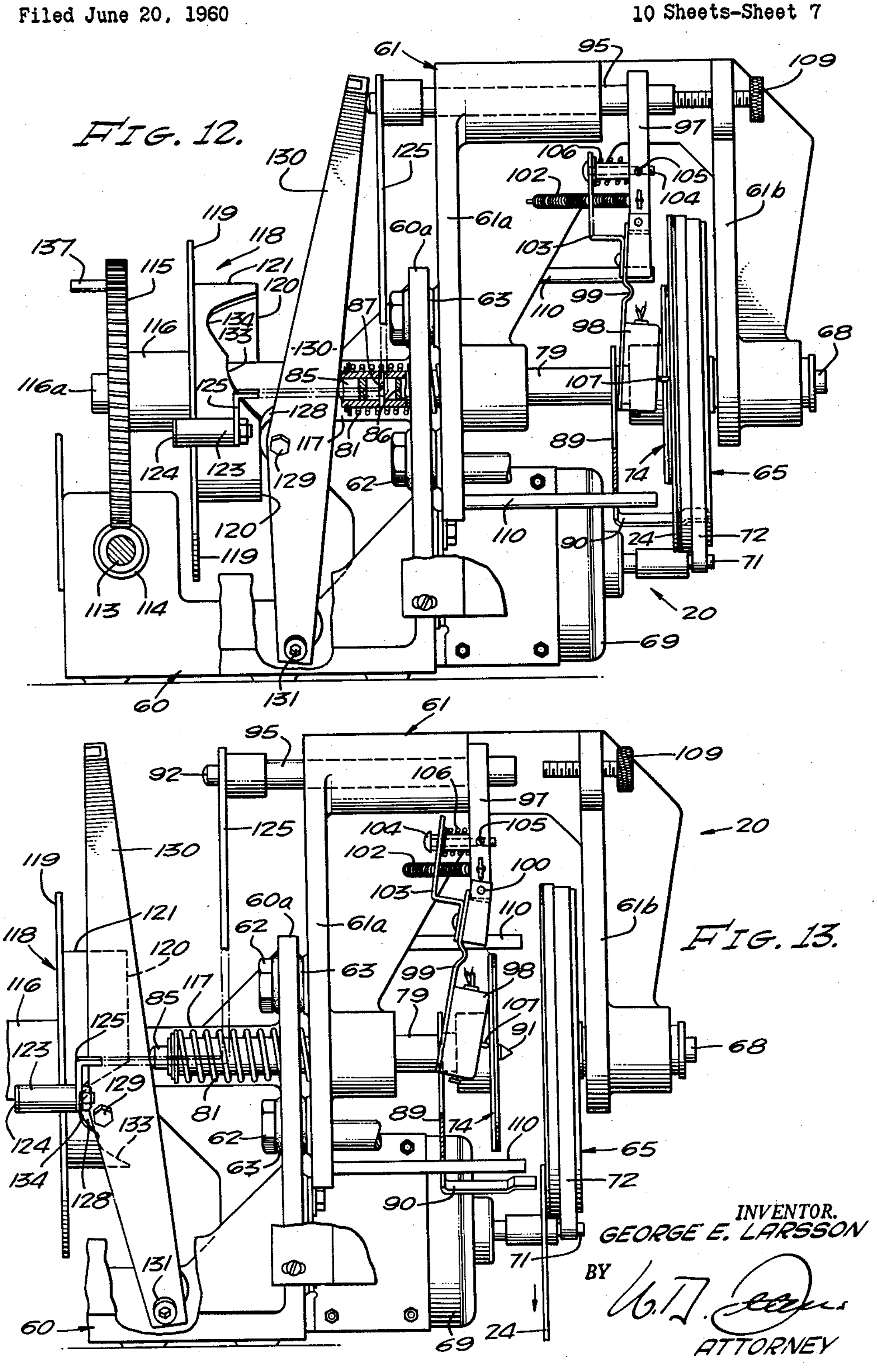
FIGURE 12 is a side elevational view on a reduced scale of principal portions of the permanet recorder showing the parts in their operating positions to cut a soundtrack on a record disc.
FIGURE 13 is a view similar to FIGURE 12 but showing the positions of the parts of the permanet recorder as a completed record is being discharged into the delivery chute.

Supported on and fixed to spool 116 along with driving gear 115 is the master cam unit 118, the spool, gear and cam unit being suitably keyed together as by screw 116*b* (FIGURE 11). As is indicated by the arrow on FIGURE 10, motor 112 operates to rotate spool 116 and master cam 118 clockwise.

Figure 14:
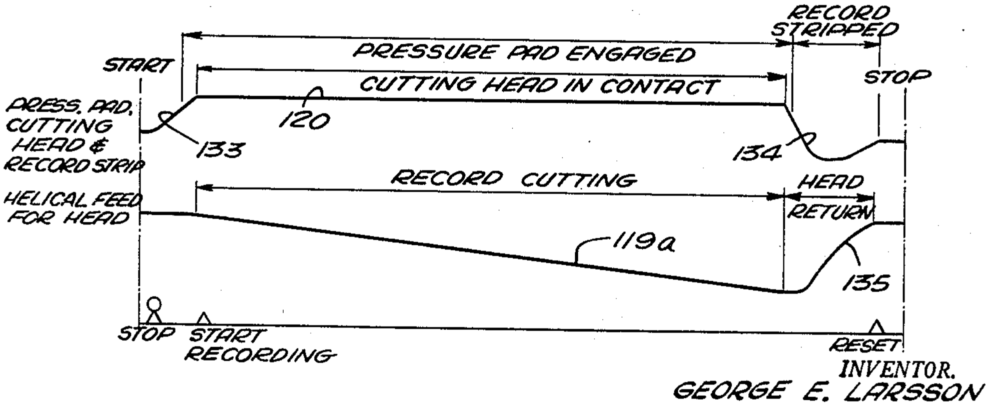
FIGURE 14 is a developed view of the cam surfaces employed to control operation of the parts of the permanent recorder, the respective portions of the surfaces being shown in their respective circumferentially spaced operating relationships.

Master cam unit 118 includes a disc 119 having its peripheral edge 119*a* contoured as best shown in FIGURES 10 and 14, it being pointed out that the major circumferential extent of this rim surface is a gentle spiral effective to guide the cutting head stylus gradually inward toward the center of the record as the soundtrack is being formed in the rotating record. The remaining rim portion 135 of cam 119*a* is contoured far more abruptly and in a manner to effect the lateral shifting of the cutting head from the center area of the completed record back to a starting position opposite the outer rim of the turntable.

Master cam unit 118 includes a second cam surface 120 formed along the free radial edge of a cylindrical member 121 suitably secured to the face of cam disc 119.

A long axis cam follower roller 123 is suitably journaled on a supporting pin 124 fixed to one end of a rigid S-shaped arm 125 having its opposite end rigidly keyed as by pin 126 to shaft 95, which shaft supports cutting head 98 (FIGURES 8 and 10). It will therefore be recognized that the rotation of the spirally contoured cam surface 119*a* of the master cam against cam roller 123 will be effective to swing arm 125 and shaft 95 to and fro in a short arc to swing the cutting head 98 crosswise of the recording surface of a blank record clamped to turntable 65. Roller 123 is held against cam surface 119*a* by spring 102 described above as connected between the cutting head supporting arm 97 and a portion of main frame 61. It is important that the width of cam roller 123 is sufficient to accommodate the requisite axial shifting of the cutting head and its supporting shaft 95 within bearings 96.

Cam surface 120 on cylinder 121 of the master cam engages a cam follower roller 128 journaled on a bolt 129 (FIGURE 10) supported between the flanges of a channel-shaped cam operating lever 130. As is best shown in FIGURE 10, cam lever 130 is inclined to the vertical and its lower end is pivotally connected to frame 60 by a pivot pin 131. Note from FIGURE 10 that the right hand flange of lever 130 is suitably notched at 132, 132 to accommodate the edge of cam cylinder 121 under certain operating movements of lever 130. The web portion of lever 130 is positioned in alignment with the adjacent axial ends of spindle 79 and cutting head supporting shaft 95 with the result that the pivoting of lever 130 under the control of cam surface 120 is effective at certain times to shift spindle 79 axially to move clamping pad into engagement with the turntable as well as to shift shaft 95 supporting the cutting head to the right to engage stylus 107 into recording position against a record.

Cam roller 128 is maintained in contact with cam surface 120 of cylinder 121 at all times through pressure exerted thereon by the combined action of spring 84 and spring 81 surrounding the left hand end of spindle 79 (FIGURE 8), it being noted that plunger 85 carried by spindle 79 is maintained in contact with lever 130 by the spring 84 mounted inside the spindle and acting on the rear end of plunger 85. In this connection it is pointed out that spring 81 is sufficiently strong as to maintain record clamping pad 74 and its supporting spindle 79 retracted to the left as well as to maintain cam lever 130 and its roller 128 in contact with cam 120 at all times.

It will be understood that cam 120 is of uniform height throughout the major portion of its length as is indicated by both FIGURE 8 and FIGURE 14, the latter showing a developed view of this cam surface. The opposite ends of the straight portion of cam surface 120 are interconnected by two interconnected notches 133 and 134, respectively, the former being somewhat shallower than notch 134. At the beginning of a recording cycle, roller 128 is seated in notch 133. Motor 112 operates to drive the cam in the direction indicated by the arrow in FIGURES 8 and 10, forcing roller 128 onto the high straight portion of cam 120. Lever 130 is therefore pivoted to the right (FIGURE 8) to shift pad 74 in the same direction to clamp a record against turntable 65. Meanwhile the upper end of lever 130 is closing rapidly toward plunger 92 slidably supported in the axial well of shaft 95. Before clamping of the record actually occurs, lever 130 will have begun to shift shaft 95 and the cutting head to the right with the result that the cutting head stylus 107 is brought into contact with the record momentarily after the record is firmly clamped to the turntable. Thus, the rotation of master cam 118 upwardly as viewed in FIGURE 8 is seen to advance roller 128 out of notch 133 and onto the high portion of cam surface 120 thereby shifting lever 130 to the right. In so doing, spindle 79 is shifted to the right together with clamping pad 74 and cradle 89. As the clamping pad starts to press the record against the turntable, the upper end of lever 130 will contact plunger 92 thereby shifting cutting head shaft 95 together with the cutting head toward the record. However, it will be understood that stylus 107 of the cutting head will normally not actually contact the record until the latter is firmly clamped in position. Any necessary over-travel between lever 130 and spindle 79 is accommodated by the lost motion between its plunger 85 and well 83 slidably supporting this plunger. It will also be noted that plunger 92 likewise has a lost motion connection with its seating well in shaft 95, this motion being accommodated by spring 93 and the slot 94 through which the assembly pin 126 extends.

While the clamping of the record is taking place and the cutting head is being moved against the outer rim of the record, cam surface 119*a* remains in supporting contact with the wide cam roller 123 and is effective through lever connection 125 with shaft 95 to hold the cutting head pivoted outwardly with the stylus close to the peripheral edge of the blank record. However, as motor 112 continues to rotate gear 115 and master cam 118, roller 123 rides along the gradually decreasing cam 119*a* allowing lever 125 and shaft 95, together with arm 97 and cutting head 98, to pivot inwardly toward the center of the disc in a spiral path. At the end of the recording period, roller 123 will be in contact with the gradually rising portion 135 of cam surface 119*a* and will be effective to rotate the cutting head and arm 97 outwardly toward the periphery of the turntable. However, this swinging action cannot take place until cam roller 128 starts to descend into notch 134 of cam 120 allowing cam lever 130 to pivot away from the turntable thereby permitting spring 102 to retract the cutting head and its supporting shaft 95 away from the record.

By the time roller 128 reaches the bottom of deep notch 134, spindle 79 and record cradle 89 will have been retracted sufficiently away from the turntable to permit the completed record to drop beyond the outer free end of cradle fingers 90. The record will then fall into delivery chute 29. Should the record tend to remain supported against pad 74 and on spindle 78 of the clamping assembly, stop members 110 will contact the outer surface of the record as the pressure pad is being retracted thereby shifting the record off the spindle 78 and onto cradle fingers 90. Tapered end 91 of spindle 78 causes the record to be shifted toward the turntable in readiness to drop past fingers 90 as soon as these are withdrawn sufficiently to the left. A moment later cam 128 rides out of notch 134 and into notch 133 at which time a cam pin 137 projecting from the outer face of gear 115 will underride the actuating roller 138 of a micro-switch 139 (FIGURES 8, 10) to de-energize driving motor 112 and stop the operation of the recorder. Spaced circumferentially to either side of stop switch 139 are two other micro-switches 140, 141, respectively, each having associated cam rollers 140′, 141′, respectively, positioned in the path of cam pin 137 and arranged to be actuated thereby to operate the switches in the manner and for purposes to be described below.

*The Control Circuit and its Operation*

The control circuit for the described automatic recorder apparatus will now be described by the aid of FIGURES 15*a* and 15*b*, taken together. For convenience and to avoid the use of a confusing number of reference characters, it will be understood that the high voltage hot bus extending generally along the left hand side of the schematic and at all times in hot condition is designated 145, whereas the opposite side of the 110 volt supply circuit is represented by the continuously hot bus 146 extending generally down the right hand side of the same figures.

Hot buses 145, 146 are provided with the usual master or service switch 147 and suitable protective fuses 148. A power transformer T has its primary connected across the 110 volt buses, and its low voltage secondary coil connected to supply low voltage power for that portion of the circuit controlled by a switch carried by a contactor on magnetic tape 11, it being preferable to keep high voltage away from the vicinity of tape 11. The two principal hot leads emanating from secondary coil 149 are designated 150 and 151, respectively. It is believed the control circuit can be best described and understood by describing it in connection with a typical operating cycle, it being ponted out that all parts are shown in their proper starting positions wherein all switches (other than relay contactors) are in open position.

Most of the initial action occurs in FIGURE 15*a* and is initiated when the patron approaches the booth containing the apparatus and steps upon a floor mat before microphone 16, this floor mat overlying a switch 153 in the low voltage circuit. The weight of the patron closes this switch thereby energizing the floor relay coil 154 to open the floor relay contactor and de-energize release coil 155 of the coin reject relay in the lower left corner of FIGURE 15*b*. During inactive periods of the recording equipment, the release coil 155 of the coin reject relay is the only one energized. The energization of this relay's release coil assures that the relay's contactor will be open to interrupt the flow of power to reject coil 158 of coin switch B under which conditions this switch refuses coins and safeguards against the operation of the permanent recorder 20 until the patron's message has been first recorded on tape recorder 10. Accordingly, all that occurs when the patron steps into the booth is the closing of pressure switch 153 to activate the lower relay 154 to open its contactor.

The patron will then read the printed instructions telling him to first insert a coin in coin switch A. The insertion of the proper coins in this switch momentarily closes coin switch A, whereupon a surge of power passes from hot bus 145 through the switch thereby energizing coil 156 of the power relay and closing both its contactors upwardly and locking them there until released by this relay's release coil.

Simultaneously therewith, closing of coin switch A supplies power to coil 157 of the coin reject relay likewise locking its contactor closed and completing the power supply to the reject coil 158 associated with coin switch B controlling the operation of permanent recorder 20. The reject mechanism of coin switch B is such that it is rendered ineffective to reject coins so long as reject coil 158 is energized. Hence the closing of coin switch A initially conditions coin switch B for subsequent operation.

A third operation automatically completed by the momentary closing of coin switch A is the energization of the timer on-off relay coil 160. This relay remains closed until again energized whereupon it opens. The closing of the contactors of the timer on-off relay completes an initial power supply to timer motor 162 to drive cam disc 163 through one complete revolution before automatically cutting off. It will be understood timer motor also drives a pointer 164 operating over a clock face conveniently displayed to the patron and containing appropriate indicia indicating the length of the normal recording period for tape recorder 10.

The activation of power relay coil 156 closes both its contactors to complete the power supply via leads 165, 166, to tape motor 13 and the amplifier of tape recorder 10. The tape recorder being energized, tape transport motor 13 starts to rotate to conduct magnetic tape 11 past recording head 14. Inasmuch as the recorder relay is de-energized, the contactors thereof are in their down or "record" position as illustrated in FIGURE 15*a* and any soundtrack pick-up by microphone 16 activates recorder head 14 and is recorded on tape 11. Hence the patron may proceed to speak into the microphone and have his voice recorded on the tape.

Simultaneously with this operation, timer motor 162 will be in operation and indicator hand 164 will be rotating clockwise to advise the patron that his recording time is elapsing at a rate readily readable from the face of the timer. As timer motor starts to rotate cam 163 driven thereby lifts cam follower 168 of the normally open micro-switch 169 thereby closing this switch to complete an alternate power supply to the timer motor by way of lead 170. Accordingly, timer motor 162 now has two parallel sources of supply. As cam disc 163 continues to rotate, the notch therein passes beneath the roller of the contact operator of switch 171 allowing this switch to close and to complete a circuit from bus 145 through lead 170, switch 171 to coil 160 of the timer on-off relay. This second energization of the timer on-off relay steps it to open its contactor thereby cutting off the initial power supply to the timer motor 162. However, this does not result in de-energizing the motor since its alternate power supply circuit is then closed through switch 169. When cam 163 has completed one revolution the notch in this cam underrides roller 168 allowing switch 169 to open and cut off the power supply to the timer motor.

Simultaneously with the de-energization of the timer motor, a strip of foil 173 on the outer face of magnetic tape 11 will have completed a complete circuit and will reach a position bridging a pair of contactors 174, thereby momentarily closing a low voltage circuit through coil 172 of the playback on-off relay as well as through release coil 175 of the power relay thereby de-energizing the tape recorder and stopping the tape. Completion of the circuit through coil 172 of the playback on-off relay closes the contactor of this relay completing a circuit through coil 176 of the playback relay to close both contactors of the latter relay to re-establish the power supply to the tape recorder amplifier and to the tape transport motor 13. The first cycle of recorder 10 has now been completed and the patron's message is recorded on tape loop 11.

The closing of the playback on-off relay initiates the second or "playback" operating cycle of recorder 10 by completing a power circuit through rectifier 177 enabling this component to rectify the low voltage A.C. power supply and charge capacitor 178. This capacitor in cooperation with the rectifier provides an adequate unidirectional power supply to energize coil 180 of the recorder relay causing its multiple contactors to be pivoted upwardly from their lower or "record" position to their upper or "playback" position. Recorder relay coil 180 remains energized throughout the second cycle of operation of tape recorder 10. During this period microphone 16 is disconnected whereas speaker 17 is connected in circuit with the amplifier output and recorder head 14 now becomes a pick-up head to feed the recorded soundtrack from the tape to the speaker permitting the patron to listen to the substance and quality of his own soundtrack.

Recorder 10 now continues to operate through a complete cycle during which tape 11 makes one complete circuit without need for action of any kind by the patron. The power relay remains de-activated and its contacts are open. This is likewise true of the timer on-off relay and of timer motor 162, the only relays then closed being the playback on-off relay, the playback relay, the recorder relay, and the floor relay. Inasmuch as recorder relay coil 180 is energized by low voltage D.C. power, there is no hum present to interfere with the high fidelity operation of the tape recorder components.

It should also be mentioned that during this second cycle cutting head coil 18 is energized through the amplifier output but this is not objectionable since the cutting head is then retracted and no record is present in permanent recorder 20. It is desirable to maintain the cutting head energized during this period because of its high impedance and consequently the high drive required to operate this coil. Were the cutting head to be deactivated during the playback cycle the amplifier might become unbalanced owing to the disproportionate drive required to operate the cutting head as compared to that required to operate the speaker.

As the continuous loop of magnetic tape 11 approaches the end of its second complete cycle, foil strip 173 carried by the tape again bridges contacts 174 for a brief interval thereby temporarily energizing coil 172 of the playback on-off relay to move its contactor to open position. This cuts off the power supply to coil 176 of the playback relay cutting off all power to the tape recorder as well as deactivating coil 180 of the recorder relay allowing its contactors to return to their lower positions. All parts are now exactly in the same position as when starting and the momentum of the tape transport mechanism suffices to carry the strip of foil 173 out of bridging contact with contacts 174 as shown in FIGURE 15*a*.

The next step is to make a permanent recording of the soundtrack now on tape 11 by transferring this track to a disc 24 supported on the turntable of recorder 20.

This operation is initiated by dropping the proper coins into coin switch B (FIGURE 15*b*) thereby momentarily closing this switch and energizing coil 184 of the disc feed relay sufficiently long to close its contact and lock it closed.

Closing of the disc feed relay coil 184 closes its contactors completing a power circuit to disc feed motor 44. The disc feed motor 44 now rotates clockwise as viewed in FIGURE 4 carrying with it cam strip 46 and crank pin 47 mounted thereon. Pin 47, operating in slot 48, then swings arm 49 to the right as viewed in FIGURE 4 causing knife blade 53 to enter between the surfaces of the two foremost discs to separate them. Record pusher 54 carried on the lower end of arm 49 then engages the rim of the foremost record pushing it laterally from the magazine and letting it fall into the chutes 25, 26 for delivery into the record receiving cradle 89 opposite the face of turntable 65.

Dispensing arm 49 continues to swing to the right until the pointed end 46*a* of cam strip 46 engages roller 57*a* of reset switch 57 (FIGURE 4) momentarily closing this switch and completing the circuit to coil 188 of the disc record relay (centrally of FIGURE 15*b*). At this same time, release coil 195 of the disc feed relay is energized momentarily thereby opening the contactor of this relay and discontinuing the initial power supply to disc feed motor 44 now energized through closed switch 56. A moment later the opposite tip 46*b* of disc feed cam 46 underrides roller 56*a* of stop switch 56 opening this switch to de-energize the disc feed motor 44. This leaves the record dispenser arm and pusher 54 positioned adjacent the right hand extremity of its path of movement as viewed in FIGURE 4 in readiness to dispense the next record to the left.

Energizing of coil 188 of the disc record relay reverses the positions of its two contactors and simultaneously energizes vacuum fan motor 189, turntable motor 69 and cam drive motor 112 thereby placing permanent recorder 20 in operation. At this time a fresh blank record is supported on cradle 89 close to the face of the turntable. Cam drive motor 112 then proceeds to conduct recorder 20 through a complete recording cycle in the manner described in detail above as regards functioning of the mechanical features. The functioning and sequence of operation of the several switches 139, 140, and 141 operatively associated with cam pin 137 projecting from the face of gear 115 will now be described.

As motor 112 starts, the cam follower roller for switch 139 rests on pin 137 to hold stop switch 139 open. As soon as motor 112 starts and turns gear 115 to rotate cam pin 137 from beneath roller 138 of stop switch 139, the latter switch closes thereby completing an alternate power supply circuit to cam motor 112. Shortly thereafter cam pin 137, which moves clockwise as viewed in FIGURE 10, underrides contact roller 141*a* of microswitch 141 closing this switch thereby completing a power circuit through leads 191 to coil 172 of the playback on-off relay (upper right hand corner FIGURE 15*a*). The momentary energization of coil 172 is sufficient to actuate this relay to closed position completing a low voltage power circuit to coil 176 of the playback relay thereby closing its contacts and completing a power circuit to the tape recorder transport motor 13 and to the recorder amplifier.

Simultaneously with the foregoing operations, a low voltage direct current power supply is completed to coil 180 of the recorder relay closing all its contactors upwardly to the "playback" position wherein the microphone is disconnected and speaker 17 is reconnected to the output of the amplifier along with coil 18 of cutting head 98. The message recorded on tape 11 during the first cycle of operation of this cycle is then picked up by head 14 of the first recorder, amplified and fed to coil 18 in the cutting head to activate stylus 107 to transfer the soundtrack to disc 24 clamped to turntable 65.

It is pointed out that during the transfer of the soundtrack to the disc, coil 188 of the disc record relay is energized momentarily thereby opening the lower contactor of the relay to discontinue the power supply to coin reject coil 158 in coin switch B. So long as reject coil 158 is de-energized it is effective to reject any coin inserted in coin switch B.

As master cam unit 118 approaches the end of one complete revolution, cam pin 137 underrides contact roller 140' of the reset relay switch 140 closing this switch and completing a power circuit through release coil 193 of the disc record relay allowing this relay to close downwardly. This restores the two contactors of this relay to their initial starting position thereby breaking the initial power circuit to vacuum motor 189, turntable motor 69, and cam drive motor 112. The opening of this initial power supply circuit to motors 189, 69 and 112 is ineffective to stop these motors since switch 139 is now closed to complete an alternate power supply to these motors. Accordingly, the three motors continue to operate until cam pin 137 underrides contact roller 138 elevating this contactor and opening stop switch 139. These motors immediately stop with pin 137 holding switch 139 open.

The several relays of the tape recorder circuit (FIGURE 15*a*) are restored to their initial starting positions in the manner described previously, namely, by the passage of foil strip 173 on the end of tape loop 11 across contacts 174 thereby momentarily energizing coil 174 of the playback on-off relay to step its contactors to open position. This de-energizes playback relay 176 to open the power supply to the tape recorder and to de-energize coil 180 of the recorder relay thereby restoring its contactors to their initial position shown in FIGURE 15*a*.

The completed record, complete with soundtrack, discharges from the turntable in the manner described above during the final moments of operation of master cam 118. The completed record drops into delivery chute 29 in readiness to be withdrawn by the patron from slot 30 in the front wall of the recorder studio as is made clear by FIGURE 1.

While referring to FIGURE 1, it is pointed out that vacuum motor 189 operates a suction fan arranged to suck a stream of air across the stylus and downwardly into suction tube 196 (FIGURE 1) having its inlet positioned closely adjacent the stylus in order that the cuttings from disc 24 may be carried to a point of disposal without risk of collecting on and about the stylus and interfering with the cutting of a true soundtrack in the disc.

*A Simplified Embodiment of the Automatic Recorder*

Referring now to FIGURE 16 there is shown a simplified embodiment of an automatic voice recorder incorporating the principles of the present invention and differing from the first described embodiment essentially in the elimination of the optional step of listening to the recording as registered on the magnetic tape before proceeding to deposit another coin to initiate transfer of the soundtrack onto a permanent record. Instead, the audible playback of the recorded soundtrack is carried out simultaneously with its transfer onto the permanent record. Because of this expedient, it is feasible to simplify the control circuit very appreciably as well as to speed up the overall operating cycle thereby making the equipment available to an increased number of patrons in a given time period.

In view of the many points of similarity between the two systems and to facilitate a ready understanding and comparison of the two embodiments, the same reference characters have been applied to the same or corresponding parts of the two embodiments and distinguished from one another by the application of a prime to those employed in the FIGURE 16 showing. In addition, it is to be understood that many of the components of the simplified recorder are identical with those described above in connection with FIGURES 1 through 15. For example, tape recorders 10, 10′ are identical as is the blank record magazine and feeding mechanisms 22, 22′ and all parts of the permanent recorders 20, 20′. In connection with the recorder 20′, one micro-switch associated with the master cam disc 115 is eliminated, along with its function. Several of the control relays as well as a second coin switch and the coin reject mechanism are also unnecessary in the second embodiment. It will be understood that the complete operating cycle is initiated by dropping the appropriate coin into the single coin switch. During the first half of the ensuing operating cycle the patron's soundtrack is recorded on the magnetic tape. The apparatus then automatically proceeds to dispense a blank record to the turntable of the second recorder and to transfer the recorded soundtrack to this permanent record and is followed by the de-activation of the equipment as soon as the parts are in their initial starting positions.

The apparatus is placed in operation (assuming master switch 147′ to be closed) by depositing the requisite coin in the coin switch shown near the left hand midportion of the schematic. The momentary closing of this switch by the coin simultaneously energizes coil 156′ of the power relay and coil 160′ of the timer on-off relay. The closing of the contact of the power relay supplies power to the tape recorder whereas the closing of the timer relay supplies power to timer motor 162′ to rotate the pointer on the dial of clock 164′ apprising the patron that the recorder is in operation and that he should start speaking into microphone 16′. During the first circuit of the continuous loop of the recording tape, the recorder relay is positioned as shown in FIGURE 16 and it is to be understood that playback head 14′ of tape recorder 10′ is deactivated as is loud speaker 17′. However, recording head 18′ and erasing head 15′ of the permanent record recorder 20′ remains in circuit with the output of the tape recorder amplifier for the same reasons pointed out above in connection with the first embodiment.

Soon after the start of timer motor 162′, cam disc 163′ attached to its shaft moves cam follower 168′ outwardly to close switch 169′ thereby establishing an alternate or substitute power supply for the timer motor. After the timer has operated through a partial revolution the cam follower of switch 171′ falls into the notch of cam disc 163′ closing switch 171′ briefly to energize timer relay 160′ a second time thereby stepping its contactor to open position cutting off the initial power supply to timer motor 162′. Timer relay remains in open position throughout the remainder of the cycle and until the next patron drops a coin in the coin switch. Following the opening of timer relay timer motor 162′ remains energized by way of switch 169′ until the timer motor has completed a temporary recording portion of the cycle whereupon cam follower 168′ drops into the notch of the cam disc 163′ and discontinues the power supply to the timer motor. This action coincides with the return of the pointer on clock 164′ to its starting position. The stopping of the hand on the timer advises the patron that the recording period is over, the approaching end of which is continuously communicated to the patron by the approach of the hand to its vertical or initial starting position.

As the timer motor approaches the end of the recording cycle foil strip 173′ on tape 11′ bridges the brushes of switch 174′ completing a circuit through release coil 175′ of the power relay allowing the armature of that relay to drop and open the power supply circuit to the tape recorder.

The closure of switch 174′ also simultaneously energizes coil 200 of a four position stepping relay operable to index a rotatable contactor arm 201 having a permanent connection to power bus 145′. Momenatry energization of coil 200 steps the contactor from its zero position to position No. 1 to energize motor 44′ of record dispensing mechanism 22′ to dispense a blank record from the magazine for delivery to turntable 65′ of the second recorder 20′. At the beginning of the dispensing cycle the pointed end 46*a*′ of cam 46′ is holding switch 56′ open. However, as the disc feed motor 44′ starts, this cam is moved out of holding position thereby allowing switch 56′ to close to complete an alternate power supply to the disc feed motor. As a record is being dispensed from the magazine cam point 46*a*′ engages the cam follower of a second switch 57′ momentarily closing this switch to again energize the coil 200 of the stepping relay indexing contactor 201 of this relay to position No. 2. When so positioned contactor 201 is effective to energize cam drive motor 112′, turntable motor 69′ and the motor 180′ of the vacuum driving the suction fan removing the cuttings from the cutting head of the permanent record recorder. Meanwhile, the disc feed motor continues to rotate until it carries one end of cam 46′ beneath the cam follower for switch 56′ to open this switch and stop motor 44′.

As soon as the cam drive motor 112′ starts to turn switch 139′ is closed to complete an alternate power supply to motors 112′, 69′ and 189′. A moment later the follower of switch 141′ associated with master cam disc 115′ falls into the depression of this cam closing this switch momentarily and again briefly energizing coil 200 of the stepping relay to index the contactor thereof to position No. 3. At this time it will be understood a blank disc has been clamped to the turntable and the cutting head will be in contact with the record and in readiness to start recording, all as explained above in connection with the first embodiment.

Movement of the stepping relay to position No. 3 energizes coil 176′ of the playback relay closing both its contactors; the closing of the lower contactor completes a power supply to the tape recorder whereas the closing of the upper contact supplies rectified power from rectifier 177′ and capacitor 178′ to coil 180′ of the recorder relay. The several contactors of this relay are then closed upwardly to de-activate microphone 16′ and to activate loud speaker 17′ along with pick-up head 14′. The soundtrack recorded on the magnetic tape is picked up and fed through the amplifier and to recording head 18′ for recordation on the rotating record mounted on the turntable.

At the end of the second complete revolution of the magnetic tape, foil strip 173′ mounted thereon bridges brushes 174' to energize coil 200 of the stepping relay for the fourth time to step it to its zero or starting position. Power continues to be supplied to the cam drive motor and to the turntable motor until the cam follower of switch 139' associated with master cam disc 115' falls into the notch of the latter, opening the circuit and de-energizing the motors in circuit therewith. The movement of the stepping relay contactor away from position No. 3 opens the power supply to coil 176 of the playback relay de-energizing this coil and opening the contacts of this relay, thereby de-energizing the recorder relay allowing its contacts to revert to their original position as shown and cutting off the power supply to the recorder. The momentum of the recorder motor carries foil 173' for a short distance and out of bridging relation with brushes of switch 174'.

All parts are now restored to their original positions in readiness for resumption of the next recording cycle and the completed record is dispensed from the turntable as explained above in connection with FIGURES 1 through 15.

While the particular automatic coin controlled recording apparatus herein shown and disclosed in detail is fully capable of attaining the objects and providing the advantages hereinbefore stated, it is to be understood that it is merely illustrative of the presently preferred embodiments of the invention and that no limitations are intended to the details of the construction or design herein shown other than as defined in the appended claims.

I claim:

1. Self-contained unitary apparatus for making a permanent recording of a soundtrack utilizing cyclically-operating apparatus employing coin-controlled means to initiate a complete operating cycle including a temporary recording operation and a permanent recording operation, said apparatus comprising a first erasible self-recycling type recorder and a second permanent record recorder, each having a predetermined starting position and operable to make a permanent type recording of a voice track temporarily recorded on said erasible recorder, microphone means for conveying sound energy into said first recorder during the temporary recording operation, timer means automatically activated simultaneously with said first recorder operable to inform the patron continuously of the relative amounts of the consumed and unconsumed proportions of the temporary recording operation, and means for operating said first and second recorders through a permanent recording operation following the conclusion of said temporary recording operation during which the temporarily recorded soundtrack is transferred to a permanent record.

2. Apparatus as defined in claim 1 characterized in the provision of a master control for said recorders operable to condition said recorders for operation when and so long as the patron is in a proper position for making a recording.

3. Apparatus as defined in claim 2 including coin-rejecting means operatively connected with coin-control means for said recorders and effective to prevent the making of a permanent record by a second patron until a soundtrack temporarily recorded by the preceding patron has been replaced by a new temporary recording on said first recorder.

4. Self-contained unitary automatic sound recording apparatus having coin-operated control means for initiating an operating cycle thereof and adapted to be operated by patrons of amusement facilities and the like without need for prior experience or instruction, said apparatus having a disconnectible power supply means closeable by said coin-operated control means and including first recorder means having an endless self-recycling magnetic tape operable in response to an operating cycle initiated by the patron depositing coins into said control means to make a temporary erasible record of the patron's voice, said first recorder means including a microphone and a loudspeaker together with means for selectively connecting the same to the input and output respectively of said first recorder means, cutting head means also connectible to said recorder output simultaneously with said loudspeaker whereby the output drive load required of said first recorder means remains constant during both playback and transfer recording of a soundtrack previously stored on said erasible record, second recorder means operable to make a permanent recording of the soundtrack initially and temporarily made by said first recorder means, said permenent recording being made on a rotating disc record by said cutting head means following completion of the temporary soundtrack by the patron on said first recorder.

5. Automatic recording apparatus as defined in claim 4 characterized by the provision of control means interconnecting said first and second recorder means operable to program the operation of both recorders and to restore the parts of both to their respective positions occupied at the start of the operating cycle after completing the transfer of the soundtrack from said first recorder means to the rotating recording disc driven by said second recorder means and including means for deactivating of the power supply to said first recorder means.

6. Automatic recording apparatus as defined in claim 4 characterized in that said coin-actuated control means includes switch controlled means arranged to be activated automatically as the patron assumes a position from which to deliver a soundtrack to said first recorder and being then effective to refuse coins from another patron unless inserted to initiate a full operating cycle of said apparatus.

7. Self-contained unitary-automatic sound recording apparatus comprising first recorder means of the self-recycling type operable when energized to operate through a temporary recording operation to make a temporary soundtrack recording followed immediately and automatically by a playback operation during which the recorded soundtrack is reproduced audibly, second recorder means operatively connected to said first recorder means for making a permanent recording of the soundtrack registered on said first recorder means during said temporary recording operation, a magazine for storing a supply of blank records for delivery to said second recorder, coin-controlled circuit means for initiating a permanent recording operation of said second recorder means and for dispensing a blank record thereto from said magazine, said last-named means including power means for forcibly dispensing a blank record generally horizontally from one side of said magazine, the movement of said power means being effective to activate both a first means for rotating the dispensed blank record while the soundtrack is being transferred thereto from said first recorder means and a second means for restoring both said recorder means to their respective initial starting positions.

8. Automatic coin-controlled sound recording apparatus comprising a motor-driven turntable, spring-powered carriage means chargeable with blank records, motor actuated means for forcibly dispensing a single record from said carriage means, means for delivering the dispensed record to said turntable, coin-actuated control means for said recording apparatus and effective initially to energize said record dispensing means and including sequentially operating programming switch means located in the path of movement of said record dispensing means and actuated thereby as the same moves to dispense a record from said magazine, said sequential programming switch means being operatively connected to means operating when activated in accordance with a predetermined program to form a soundtrack on the dispensed record, to dispense the completed record and to deactivate said apparatus after first restoring the same to its initial starting position.

9. Automatic coin-controlled recording apparatus as defined in claim 8 characterized in that said turntable includes means for clamping a blank record thereto during the formation in the latter of a soundtrack, soundtrack forming means movable toward and away from the surface of said clamped record after the record has been clamped in place, and said sequentially actuated programming switch means including a single cam-actuated lever for advancing said clamping means and said soundtrack forming means against said record in timed delay sequence and for retracting the same in reverse timed delay sequence.

10. Automatic apparatus for forming soundtracks in rotating disc records, said apparatus comprising a main frame supporting a motor driven turntable with its axis generally horizontal, rotatably-supported axially-shiftable clamping means for clamping a record to said turntable under pressure and for dispensing the completed record therefrom, said clamping means having mounted thereon means for receiving a blank record and aligning the same with said turntable, fixed stop means spaced horizontally closely beside the face of said turntable, said clamping means and said record receiving and aligning means both extending crosswise of said record and remaining there until the completed record is ready for discharge from said apparatus and then being bodily retractable as a unit upon the completion of the record and cooperating with said fixed stops to dispense the record from said turntable.

11. Automatic recorder aparatus as defined in claim 10 characterized in the provision of a movably supported soundtrack cutting head having a stylus engageable with a record clamped to said turntable, and a common actuating lever mounted on said main frame movable to shift said record clamping means and said cutting head into engagement with a record on said turntable in one predetermined timed sequence when moved in one direction and to move away from said turntable in the reverse timed sequence when said lever moves in the opposite direction.

12. Automatic recorder apparatus as defined in claim 11 characterized in the provision of a common driven cam and cam follower and cooperating spring means for operating said lever through a to-and-fro operating cycle.

13. In an automatic recorder for making disc records, a main frame rotatably supporting a motor-driven turntable, a clamping pad opposite the central area of said turntable for holding a record clamped to said turntable, an axially shiftable spindle rotatably supporting said clamping pad, cradle means mounted on said spindle and cooperable with the rim of said turntable for receiving a blank record and aligning the same coaxially of the turntable while said clamping pad is in partially open position, and record ejector means cooperable with said cradle means to eject the record as said spindle and the cradle means mounted thereon are moved further and toward a position fully retracted from said turntable.

14. In an automatic recorder for making disc records, a main frame comprising a main power unit assembly and a turntable unit assembly detachably secured together through resilient connectors effective to isolate the turntable from vibrations emanating from said power unit assembly, said turntable unit rotatably supporting a turntable and record clamping means therefor as well as a soundtrack cutting head, said power unit assembly including a motor for driving said turntable and a second motor driving cam means operatively associated with said record clamping means and with said cutting head, said motor-driven cam means comprising a cam disc rotating through 360 degrees for each full recording cycle of said recorder and having one cam surface effective to advance said cutting head radially to-and-fro across the face of a record to form a soundtrack therein and a second cam surface controlling the movement of said cutting head and said record clamping means axially toward and away from the face of said turntable.

15. An automatic recorder as defined in claim 14 characterized in that the axis of said turntable is disposed generally horizontally, and blank record magazine means operable to dispense individual records for gravity movement into clamping position on said turntable.

16. In combination, automatic recorder apparatus adapted to operate through an identical cycle in response to and each time proper coins are inserted in a coin-actuated switch mechanism, said apparatus including a blank record magazine a generally horizontal axis motor-driven turntable supported below said blank record magazine, said record magazine being of the type having means supporting two rows of records vertically on edge with adjacent rim areas of the two rows interleaved to prevent sticking and to facilitate dispensing thereof, means for dispensing successive records in opposite directions laterally from the remotely spaced sides of said rows, and means for delivering a record dispensed from either row onto said turntable through an identical path of approach to said turntable thereby permitting other components of said recorder to be disposed adjacent other areas of said turntable without interference with the supply and discharge of records to and from said turntable.

17. The combination defined in claim 16 characterized in that said means for deliverying a record to said turntable includes guide chute means disposed in a generally vertical plane, and discharging crosswise of the face of said turntable from one edge thereof, and further characterized in the provision of means movably supporting a soundtrack cutting head adjacent said record on the opposite side of its center from the discharge end of said record guide chute.

18. Self-contained unitary apparatus for making a permanent recording of a soundtrack utilizing cyclically operating apparatus employing coin actuated means to initiate an operating cycle, said apparatus comprising first recorder means of the erasible self-recycling type and second recorder means operable to make a permanent type recording of a soundtrack temporarily recorded on said first recorder means, and automatic programming control means for operating said first and second recorder means through a complete operating cycle including a preliminary step in which only the first recorder means is in operation and a final step in which both recorder means are operated in synchronism, said control means including means for de-activating said apparatus at the conclusion of said final step with all parts positioned in readiness for a repeat cycle of operation identical with the preceding operating cycle.

19. Apparatus as defined in claim 18 characterized in that said control means includes a stepping relay having a plurality of positions each operable to control a different operation of the operating cycle, and said control means including means for energizing said stepping relay in timed sequence as required to carry out the separate steps of the operating cycle.

20. Apparatus as defined in claim 18 characterized in the provision of a single coin actuated means for initiating a complete operating cycle of both said first and second recorder means.

References Cited in the file of this patent

UNITED STATES PATENTS

| | | |
|---|---|---|
| 1,772,990 | Feher | Aug. 12, 1930 |
| 1,896,851 | Raynolds | Feb. 7, 1933 |
| 2,229,430 | Warner | Jan. 21, 1941 |
| 2,329,107 | Clausen | Sept. 7, 1943 |
| 2,614,846 | Cain | Oct. 21, 1952 |
| 2,615,993 | Carter | Oct. 28, 1952 |
| 2,925,475 | Zorn | Feb. 16, 1960 |
| 3,034,792 | Kenney et al. | May 15, 1962 |

OTHER REFERENCES

FM-TV, November, 1949, vol. 9, Issue 11, pages 25, 26 28 and 30.